United States Patent Office 3,382,166
Patented May 7, 1968

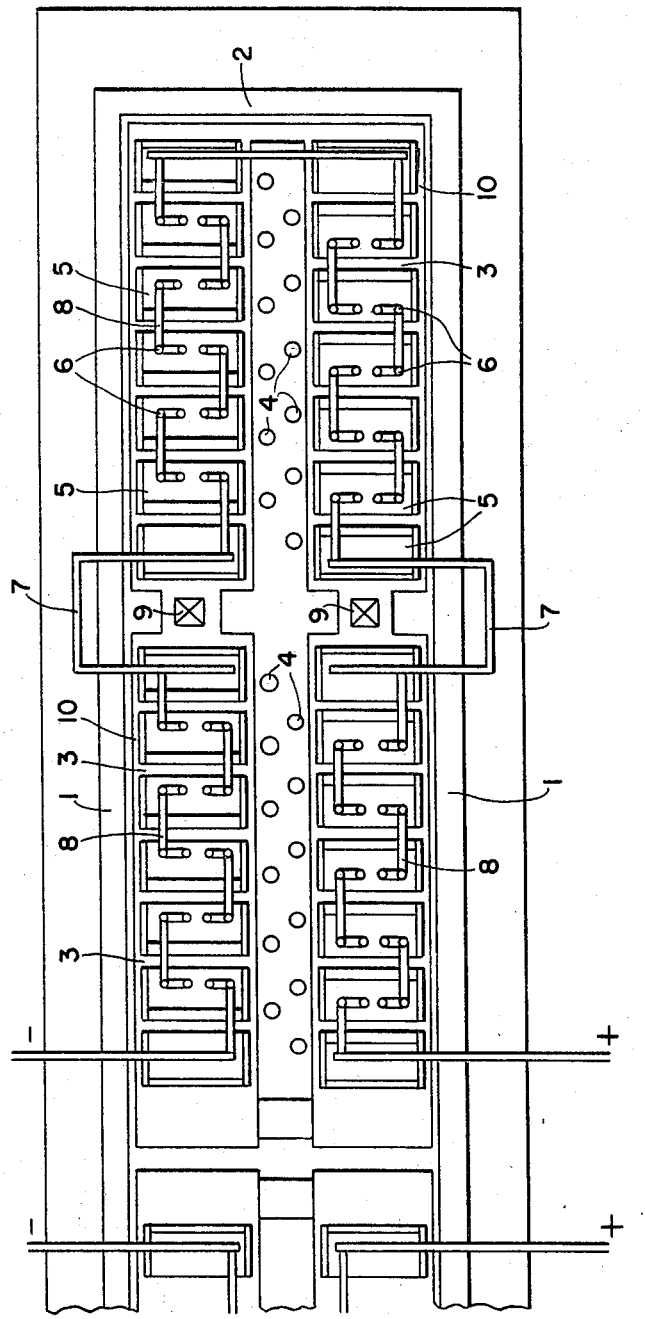

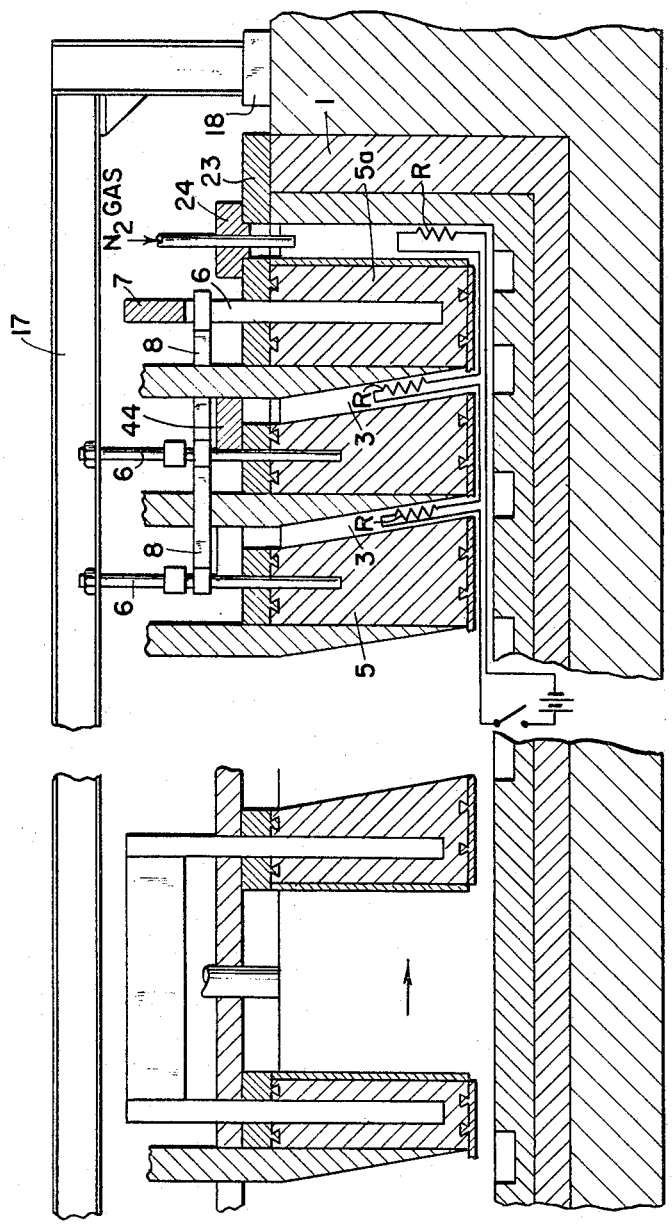

3,382,166
METHOD AND APPARATUS FOR STARTING UP MULTICELL ELECTROLYTIC FURNACES FOR ALUMINUM PRODUCTION
Giuseppe de Varda, Milan, Italy, assignor to Montecatini Edison S.p.A., Milan, Italy
Filed May 27, 1964, Ser. No. 370,644
Claims priority, application Italy, May 29, 1963, 11,200/63
9 Claims. (Cl. 204—244)

ABSTRACT OF THE DISCLOSURE

A multicell furnace apparatus for production of aluminum by electrolysis includes a refractory furnace wall and bottom structure for containing a fused bath of alumina, a plurality of transverse electrodes suspended within and spaced from the structure and including one or more groups in series, each comprising a terminal cathode, a terminal anode and at least one bipolar electrode having cathode and anode faces, the bipolar electrode or electrodes of each group in series being disposed between the terminal cathode and anode, means for impressing an electric current across the anode and cathode, means for supporting the electrodes including: (a) suspension beam means insulated from and mounted above the furnace structure, (b) at least two current-conducting rigid suspension means joined at one location thereof to the beam means and fixed along a predetermined contact area thereof within respective ones of the bipolar electrodes; the rigid suspension means having an insulator electrically insulating the electrodes from the beam means, the supporting means further including current-supply means insulated from the beam means and supporting the terminal anode and terminal cathode from the beam means and electrically connected to the terminal anode and cathode ones of the electrodes, and short-circuiting means for temporarily electrically connecting the suspension means of adjacent ones of the bipolar electrodes so that the bipolar electrodes are in series circuit between the anode and cathode.

The invention also includes method for starting up multicell aluminum electrolytic furnaces equipped with bipolar electrodes and terminal electrodes suspended from above within a furnace vat, comprising the steps of preheating the furnace vat, and subsequently electrically short-circuiting the suspended electrodes while protecting the furnace vat and electrodes against excessive air infiltration whereby the electrodes are heated due to the direct passage of electric current through the bipolar electrodes themselves.

This invention relates to a method and apparatus for starting up of electrolytic furnaces for the production of aluminum, and more particularly for the starting up of multicell furnaces provided with suspended electrodes of the type described in copending applications Ser. No. 214,020 of De Varda et al., filed Aug. 1, 1962, now U.S. Patent No. 3,178,363; and Ser. No. 321,577 of Oláh De Garáb, filed Nov. 5, 1963, now Patent No. 3,352,767, both assigned to the assignee of the present invention.

The method of starting up conventional electrolytic furnaces employed for producing aluminum, i.e. those having a cathodic vat with immersed anodes, is generally effected by introducing coke between the cathode and anode, and short-circuiting the cell through this coke layer, which, by virtue of its resistance, supplies the heat necessary to cause the preheating of the furnace to a sufficiently high temperature (of about 900° C.) to allow introduction of the bath. The coke floating on the fused bath surface is subsequently removed by means of ladles.

Another method of starting up multicell electrolytic furnaces which are equipped with embedded bipolar electrodes is described in Italian Patent 578,729, which discloses the use of a furnace having stationary bipolar electrodes built of carbonaceous blocks superposed in layers and insulated from each other by means of thin layers of alumina, and the introduction of molten aluminum into the furnace, the furnace having already been preheated by means of removable electric resistances to the melting temperature of aluminum. This introduction of molten aluminum brings about a short-circuit between the series of cells, namely between the terminal electrodes of the series of cells and the lower blocks of the intermediate bipolar electrodes, heating the electrodes to about 900° C.

Neither of these prior art starting up processes have proved satisfactory with furnaces of the type described in the above-mentioned applications Ser. No. 214,020 and Ser. No. 321,577. In fact, the first-mentioned above process requires a rather complicated starting method. More precisely, the drawback of the first above-described method, using coke, lies in the fact that filling at least part of the space intended for subsequently containing the bath requires a rather appreciable amount of coke. Removal of the coke after preheating and the gradual introduction of the fluid bath is neither rapid nor easy. Likewise, the second method of starting up by introducing preheated molten aluminum into a preheated vat, cannot be carried out as such with advantage in such furnaces.

Such shortcomings are dispensed with according to the present invention, which provides, in particular, a method and apparatus for starting up multicell furnaces having suspended electrodes and in the absence of coke.

It is therefore an object of the present invention to provide a method and apparatus for starting up of multicell furnaces equipped with bipolar electrodes suspended from above, which will overcome the aforementioned disadvantages, which will be simple in construction, economical to carry out, and simple and efficient in operation.

To these ends, and in accordance with the process of the invention, the starting up of the furnace is carried out by first preheating the furnace vat in a conventional manner, and then applying a second preheating step at the electrolysis temperature while the furnace vat is empty, this preheating in the second step being effected by electrically short-circuiting the electrodes, either in series or in parallel, preferably through the suspension members which support the electrodes from above.

The apparatus according to the invention includes detachable short-circuiting bars or latches connected in staggered position between the metallic suspension rods which normally support the electrodes from above.

In the accompanying drawings, FIG. 1 illustrates, by way of a non-restrictive example, a schematic plan view from above, of a furnace provided with starting short-circuiting connections according to the present invention.

FIG. 2 is a longitudinal section of a series of cells of the furnace according to FIG. 1.

In the drawings, reference numerals 1 and 2 refer to the outer walls of the furnace on the long and short sides, respectively. As is more completely described in the above-mentioned copending application, Ser. No. 214,020, the furnace vat 1, 2 for containing the molten bath is made of carbonaceous material and is lined on its entire inner surface by a refractory layer. The vat 1, 2 is protected on the outside of an insulating jacket, providing thermal insulation. Suspended in the vat 1, 2 are electrodes 5, rigidly supported from above by iron suspension bars or wires 6, fastened into the electrodes 5 and fixed to a supporting structure or beam 17 above the furnace vat, with respect to which beam the iron bars or wires 6 are insulated by means of insulators 20. Preferably at least two supporting bars 6 are provided for each electrode. The suspended electrodes 5, 5a are spaced apart to define interelectrode gaps 3 between them. Along the central longitudinal portion of the furnace are provided tapping pockets 4, for removing the molten aluminum product. Electric current is supplied by means of current-supply bars 7 only to the terminal electrodes 5a, similarly suspended from the beam 17 above the vat. The beam 17 is insulated from the vat by insulating means 18. For temporarily electrically connecting the suspension bars 6 of adjacent electrodes and the current-supply bars 7 of the terminal electrodes are a plurality of short-circuiting connecting members 8, such as bars or removable latches. The connecting members 8 may connect the electrodes 5, 5a in series, staggered from electrode to electrode as shown in FIG. 1, or may connect to the electrodes in parallel. The furnace is also provided with feeding devices 9, for introducing alumina into the vat. The suspended electrodes 5, 5a are spaced from the sides 1 of the vat to provide gaps or passageways 10 for circulation of the fused bath.

The method of starting up the furnace according to the illustrated example of the invention is carried out as follows. The furnace vat is first preheated in an initial step with known means, for example by means of electrical resistances incorporated into or inserted into various points in the outer walls 1, 2 and into the bottom of the furnace vat, and/or by other movable electric resistances R inserted into the free spaces of the furnace, such as into gaps 3, 10 and tapping pockets 4. A second preheating step according to the invention is then applied. This involves short-circuiting all of the suspended electrodes 5 through the iron suspension bars 6 fastened in the electrodes, and through the connecting members 8. Accordingly, during the entire course of this second preheating steps, the suspension bars 6, which are electrically insulated from the remainder of the furnace, will serve as current adductors, so that the contact resistance of their surfaces embedded in the electrodic structure, as well as the electrodes 5, 5a themselves, are utilized to generate Joule's heat by converting the electrical energy into heat energy.

The contact area between the suspension bars 6 and the electrodes 5, 5a in which they are fixed must be such as to ensure a contact drop and resistance sufficient to generate the amount of heat required to bring the electrodic structure up to the desired temperature of about 900° C. The current-supply bars 7 are thus therefore temporarily connected in series so that the short-circuit current entering through one or more suspension bars 6 placed at one side of the electrode, passes through the electrodic structure and through one or more electrodic bars 6 placed at the other side of the same electrode, and then passes through a current-carrying connecting member 8, enters the other suspension bar or bars opposite the latter and fastened into the structure of the next electrode. The current enters the electrodic structure through the contact area between the suspension bars 6 and the electrode 5, passes through the electrodic structure and comes out of the laterally opposite bar assembly 6, and so on.

After the furnace vat reaches the desired temperature, the current is switched off, the short-circuiting members 8, which temporarily bridge adjacent electrodes and connect the respective suspension bars 6, are removed. The fused bath, and (if desired even prior to this) the fused aluminum are placed in the furnace. The current is switched on again and the electrolysis process and the feeding system 9 for introducing the alumina then begins.

Over the entire course of the preheating operation, including the first and second steps above described, the furnace is kept carefully closed from above by a cover 24 so as to reduce heat losses, and to prevent excessive air infiltration which would cause combustion of the carbonaceous material structures. This preheating may also be advantageously carried out in an atmosphere of inert gas, for example nitrogen.

It should be noted that the terminal electrodes may be suspended otherwise than from the current-supply means and the electrodes may be short-circuited otherwise than through their suspension means. The beam is representative of one or more beam means.

It will be understood by those skilled in the art from the foregoing that variants other than those illustrated and described are possible, within the concepts of the present invention as defined in and within the scope of the claims appended hereto.

I claim:

1. A multicell furnace apparatus for production of aluminum by electrolysis, comprising a refractory furnace wall and bottom structure for containing a fused bath of alumina, a plurality of transverse electrodes suspended within and spaced from said structure and including one or more groups in series, each comprising a terminal cathode, a terminal anode and at least one bipolar electrode having cathode and anode faces, said bipolar electrode of each group in series being disposed between the terminal cathode and anode, means for impressing an electric current across said anode and cathode, means for supporting said electrodes including: (a) suspension beam means insulated from and mounted above said furnace structure, (b) at least two current-conducting rigid suspension means joined at one location thereof to said beam means and fixed along a predetermined contact area thereof within respective ones of said bipolar electrodes; said rigid suspension means having an insulator electrically insulating said electrodes from said beam means, said supporting means further including current-supply means insulated from said beam means and supporting said terminal anode and terminal cathode from said beam means and electrically connected to said terminal anode and cathode ones of said electrodes, and short-circuiting means for temporarily electrically connecting said suspension means of adjacent ones of said bipolar electrodes so that said bipolar electrodes are in series circuit between said anode and cathode.

2. A multicell furnace apparatus for production of aluminum by electrolysis, comprising a refractory furnace wall and bottom structure for containing a fused bath of alumina, a plurality of transverse electrodes suspended within and spaced from said structure and including one or more groups in series, each comprising a terminal cathode, a terminal anode and at least one bipolar electrode having cathode and anode faces, said bipolar electrode or electrodes of each group in series being disposed between the terminal cathode and anode, means for impressing an electric current across said anode and cathode, means for supporting said electrodes including suspension beam means insulated from and mounted above said furnace structure, at least two current-conducting rigid suspension means joined at one location thereof to said beam means and fixed along a predetermined contact area thereof within respective ones of said bipolar electrodes, said rigid suspension means having an insulator electrically insulating said electrodes from said beam means, said supporting means further including current-supply means insulated from said beam means and supporting said terminal anode and terminal cathode from said beam means and electrically connected to said terminal anode and cathode ones of said electrodes, and short-circuiting means for temporarily electrically connecting said suspension means of adjacent ones of said bipolar electrodes so that said bipolar electrodes are in parallel circuit between said anode and cathode.

3. Method for starting up multicell aluminum electrolytic furnaces equipped with bipolar electrodes and terminal electrodes suspended from above within a furnace vat, comprising the steps of preheating the furnace vat, and subsequently electrically short-circuiting the suspended electrodes in series while protecting the furnace vat and electrodes against excessive air infiltration whereby said electrodes are heated due to the direct passage of electric current through said bipolar electrodes themselves.

4. Method according to claim 3, said step of protecting the structure against excessive air infiltration including covering the furnace vat and electrodes and providing an inert atmosphere within the vat.

5. Method according to claim 4, said inert atmosphere being provided by introducing nitrogen gas into the furnace vat.

6. Method for starting up multicell aluminum electrolytic furnaces equipped with bipolar electrodes and terminal electrodes, suspended from above within a furnace vat, comprising the steps of preheating the furnace vat, and subsequently electrically short-circuiting the suspended electrodes while protecting the furnace vat and electrodes against excessive air infiltration whereby said electrodes are heated due to the direct passage of electric current through said bipolar electrodes themselves, said short-circuiting of the electrodes being carried out by connecting the electrodes in parallel.

7. Method according to claim 6, said step of protecting the structure against excessive air infiltration including covering the furnace vat and electrodes and providing an inert atmosphere within the vat.

8. Method according to claim 7, said inert atmosphere being provided by introducing nitrogen gas into the furnace vat.

9. Method for starting up multicell aluminum electrolytic furnaces equipped with bipolar electrodes and terminal monopolar electrodes suspended from above within a furnace vat, comprising the steps of preheating the furnace vat, electrically short-circuiting said suspended electrodes relative to each other in sequence while the furnace is empty of liquid bath and while simultaneously protecting the furnace vat and electrodes against excessive air infiltration, adding fused bath and/or molten aluminum to the vat, disconnecting the short-circuited electrodes from each other, and passing electric current only to said terminal electrodes.

References Cited

UNITED STATES PATENTS

| | | | |
|---|---|---|---|
| 775,060 | 11/1904 | Blackmore | 204—244 |
| 2,748,073 | 5/1956 | Mellgren | 204—246 |

FOREIGN PATENTS

| | | |
|---|---|---|
| 660,739 | 4/1963 | Canada. |

HOWARD S. WILLIAMS, *Primary Examiner.*

D. R. VALENTINE, *Assistant Examiner.*